(12) United States Patent
McDowell et al.

(10) Patent No.: US 11,692,507 B2
(45) Date of Patent: Jul. 4, 2023

(54) EXTERNAL COMBUSTION HEAT ENGINE COMBUSTION CHAMBER

(71) Applicant: Quantum Industrial Development Corporation, San Antonio, TX (US)

(72) Inventors: Joseph Shae McDowell, San Antonio, TX (US); M. K. Balsubramanya, San Antonio, TX (US); Kevin M. Chandler, San Antonio, TX (US); J. Harold Idell, Sedona, AZ (US); Victoria Watson, San Antonio, TX (US)

(73) Assignee: Quantum Industrial Development Corp., San Antonio, TX (US)

( * ) Notice: Subject to any disclaimer, the term of this patent is extended or adjusted under 35 U.S.C. 154(b) by 0 days.

(21) Appl. No.: 17/260,543

(22) PCT Filed: Jul. 18, 2019

(86) PCT No.: PCT/US2019/042499
§ 371 (c)(1),
(2) Date: Jul. 28, 2021

(87) PCT Pub. No.: WO2020/018855
PCT Pub. Date: Jan. 23, 2020

(65) Prior Publication Data
US 2021/0270205 A1 Sep. 2, 2021

Related U.S. Application Data

(60) Provisional application No. 62/700,263, filed on Jul. 18, 2018, provisional application No. 62/700,255, (Continued)

(51) Int. Cl.
*F02G 1/055* (2006.01)
*F23C 7/00* (2006.01)

(52) U.S. Cl.
CPC .............. *F02G 1/055* (2013.01); *F23C 7/004* (2013.01); *F02G 2242/40* (2013.01);
(Continued)

(58) Field of Classification Search
CPC .. F02G 1/055; F02G 2242/40; F02G 2254/10; F02G 2254/60; F02G 2258/20; F23C 7/004
See application file for complete search history.

(56) References Cited

U.S. PATENT DOCUMENTS 4,463,214 A     7/1984  Lowther
4,522,030 A *   6/1985  Corey ..................... F02G 1/053
                                                        60/517

(Continued)

FOREIGN PATENT DOCUMENTS

JP        2015140713 A      8/2015

*Primary Examiner* — Mickey H France
(74) *Attorney, Agent, or Firm* — John A. Fortkort; Fortkort & Houston PC (57) ABSTRACT

A device is disclosed herein which provides a domed cover of a combustion chamber enclosure applicable for use in Stirling Cycle engines, Ericsson Cycle engines, Rankine Cycle engines or other external combustion heat engine types which allows for the free flow of combustion air from the outer margins of the device toward the combustion air inlet in a vortexual fluid flow to achieve a more balanced stoichiometric ratio of the fuel/air mixture before ignition. This may be achieved by the employment of vanes to direct combustion air in a swirling vortexual flow as the combustion air enters the combustion chamber. Thermal barrier coatings and insulative materials may also be employed to minimize parasitic heat loss.

16 Claims, 10 Drawing Sheets

Related U.S. Application Data filed on Jul. 18, 2018, provisional application No. 62/700,223, filed on Jul. 18, 2018, provisional application No. 62/700,238, filed on Jul. 18, 2018.

(52) U.S. Cl.
CPC ...... *F02G 2254/10* (2013.01); *F02G 2254/60* (2013.01); *F02G 2258/20* (2013.01)

(56) References Cited

U.S. PATENT DOCUMENTS

| | | | | |
|---|---|---|---|---|
| 4,582,123 A | * | 4/1986 | Williams | F24F 5/001 |
| | | | | 236/44 C |
| 4,582,126 A | * | 4/1986 | Corey | F28F 21/04 |
| | | | | 165/145 |
| 4,639,212 A | * | 1/1987 | Watanabe | F02G 1/055 |
| | | | | 60/517 |
| 4,691,668 A | | 9/1987 | West | |
| 5,003,778 A | * | 4/1991 | Erber | F02G 1/055 |
| | | | | 431/247 |
| 7,469,760 B2 | | 12/2008 | Karmen et al. | |
| 7,726,130 B2 | | 6/2010 | McDowell | |
| 8,188,359 B2 | | 5/2012 | Chakraborty | |
| 8,713,924 B2 | | 5/2014 | Bruck et al. | |
| 10,876,456 B2 | | 12/2020 | Junio et al. | |
| 11,535,240 B2 | | 12/2022 | McDowell et al. | |
| 2005/0223710 A1 | * | 10/2005 | Creighton | F23R 3/28 |
| | | | | 60/740 |
| 2013/0295326 A1 | * | 11/2013 | Doesburg | C23C 4/11 |
| | | | | 428/131 |
| 2014/0026933 A1 | | 1/2014 | Kell et al. | |
| 2021/0179060 A1 | | 6/2021 | McDowell | |

\* cited by examiner

EXTERNAL COMBUSTION HEAT ENGINE COMBUSTION CHAMBER

CROSS-REFERENCE TO RELATED APPLICATION

This application is a national stage filing of PCT/US19/42499, filed on Jul. 18, 2019, having the same inventors and the same title, and which is incorporated herein by referenced in its entirety; which claims the benefit of priority from U.S. provisional application No. 62/700,263, filed Jul. 18, 2018, having the same inventors and entitled "External Combustion Heat Engine Combustion Chamber", which is incorporated herein by referenced in its entirety, which also claims the benefit of priority from U.S. provisional application No. 62/700,255, filed Jul. 18, 2018, having the same inventors and entitled "External Combustion Heat Engine Combustion Chamber Dome Cover", which is incorporated herein by referenced in its entirety, which also claims the benefit of priority from U.S. provisional application No. 62/700,238, filed Jul. 18, 2018, having the same inventors and entitled "External Combustion Heat Engine Combustion Chamber Vortexual Fluid Flow and Flame Front Propagation Inducer", which is incorporated herein by referenced in its entirety, and which also claims the benefit of priority from U.S. provisional application No. 62/700,223, filed Jul. 18, 2018, having the same inventors and entitled "External Combustion Heat Engine Combustion Chamber", which is incorporated herein by referenced in its entirety.

FIELD OF THE DISCLOSURE

The present disclosure pertains generally to external combustion engines, and more particularly to combustion chambers and components thereof for Stirling cycle engines, including dome covers, preheaters, and vortex inducers.

BACKGROUND OF THE DISCLOSURE

In external combustion heat engine designs (such as those implementing the Stirling Cycle, Ericson Cycle or Rankine Cycle), combustion takes place at atmospheric pressure in a combustion chamber enclosure. This combustion chamber enclosure is isolated from the working fluid (also referred to as the motive gas) to which thermal energy is transferred to drive the mechanisms of the engine. Typically, thermal energy from combustion is transferred to the working fluid through the walls of an array of heater tubes or boiler tubes in the heater head or boiler. This transfer mechanism may involve both conductive and radiative thermal energy transfers.

The presence of a plurality of pistons within the engine requires nearly equivalent amounts of thermal energy to be absorbed at nearly equal rates by the array of heater or boiler tubes. This is necessary to ensure that a balanced and sustained external combustion cycle is initiated for maximum efficiency. Methods to accomplish this have included the application of devices that create a turbulent flow within the combustion chamber. However, this approach can result in hotspots within the combustion chamber, and incomplete combustion.

External combustion heat engines are typically designed such that combustion takes place at atmospheric pressure in a combustion chamber enclosure which is external to, or isolated from, the motive gas or working fluid to which thermal energy is transferred to drive the mechanisms of the engine. Typically, thermal energy from combustion is transferred to the working fluid or motive gas through the walls of an array of tubes making up the heater head or boiler by means of both conductive and radiative thermal energy transfer.

There is a time delay from the moment of initial ignition of the fuel/air mixtures before a sustained external combustion cycle can be initiated. This delay is known in the art as the "cold start penalty." The "cold start penalty" is a function of the rate at which thermal energy from combustion is transferred to the working fluid or motive gas and other parts of the engine. Minimizing the time delay of the "cold start penalty" reduces the fuel consumption and thereby improves the overall thermal efficiency of these engine types.

During operation of an external combustion engine, thermal energy from combustion is transferred to the plurality of heater tubes, and then subsequently to the mechanisms of the engine, at a nearly equal rate to ensure a balanced and sustained external combustion cycle. Methods to accomplish this have included the application of devices to pre-heat the combustion air before mixing with the atomized fuel or vaporized fuel to provide for a favorable thermal gradient within the combustion chamber and improve the rate of diffusion of the fuel/air mixture. These devices typically have been steel heat transfer fins that do not have a favorable coefficient of thermal conductivity. Their use thus results in an extended warm-up period before combustion occurs and during which the steel is heated to an optimal temperature for the transfer of thermal energy to combustion air.

The poor thermal conductivity of the heat transfer steel fins contributes to the "cold start penalty." The boundary layer effect along the surfaces of the heat transfer fins inhibits thermal energy transfer from the surface of the heat transfer fins to the incoming combustion air, which is an additional contributing factor to the "cold start penalty." This is the state of the art of the steel heat transfer fin design of pre-heaters, which limits the overall thermal efficiency of the engine.

Other attempts in the art have also been made to preheat the air that forms a fuel/air mixture before combustion of the same. Thus, for example, the internal combustion engine design of the now obsolete Hot Vapor Engine heated the fuel to vaporize it in the carburetor, which also partially preheated the combustion air as well. This proved to be a more fuel efficient technique than conventional carburetors at the time, but this technique was only applicable to Otto Cycle internal combustion engines. The mixing of hot fuel vapors with combustion air was accomplished at atmospheric pressure, which provided for a more stoichiometrically balanced mixture of both the fuel vapors and the combustion air by increasing the rate of diffusion of the mixing gases. Once the fuel/air mixture was introduced into the cylinder, compression condensed the fuel vapors into a fine mist of droplets before ignition, subsequently resulting in trace levels of particulate pollutants in the exhaust gases. Moreover, the combustion under compression resulted in significant levels of Nitrous-Oxide compounds ($NO_x$) in the tailpipe emissions, which thus needed to be mitigated by the employment of catalytic convertors or other devices to meet modern emissions standards.

The technical problems that the present invention resolves, are not limited to those mentioned above, and those that are not mentioned shall be clearly understood by a person or persons skilled in the art by examining the specifications of the present invention disclosed herein.

SUMMARY OF THE DISCLOSURE

In one aspect, an external combustion engine is provided which comprises at least one piston; a heat source which includes a combustion chamber where a gas/air mixture undergoes combustion to generate heat; a heat sink; and a working fluid which drives said at least one piston by traveling in a closed loop between said heat source and said heat sink; wherein said combustion chamber is equipped with an inlet for said gas/air mixture, and a set of spiral vanes which impart a vortex-like flow to the fluid gas mixture as it approaches the combustion chamber inlet.

In another aspect, an external combustion engine is provided which comprises at least one piston; a heat source which includes a combustion chamber where a mixture of a fuel and a combustion gas undergoes combustion to generate heat and exhaust gases, wherein said combustion chamber is equipped with at least one inlet through which said combustion gas is introduced to the combustion chamber, and at least one outlet through which the exhaust gases are removed from the combustion chamber; a heat sink; a working fluid which drives said at least one piston by traveling in a closed loop between said heat source and said heat sink; and a plurality of heating blocks through which said combustion gas passes as said combustion gas flows from said at least one inlet to said combustion chamber.

In a further aspect, an external combustion engine is provided which comprises a source of combustion gas; a combustion gas manifold which is in fluidic communication with said source of combustion gas; a combustion chamber where a mixture of the combustion gas and fuel undergoes combustion to generate heat; and a cover which encloses said combustion chamber, wherein said cover has a first layer and a second layer which are spaced apart from each to form a fluidic flow path between them, and wherein said second layer contains an aperture which is in fluidic communication with said combustion gas manifold via said fluidic flow path.

DETAILED DESCRIPTION OF THE DISCLOSURE

The science of the combustion of fuels is well documented. Combustion of fuel/air mixtures is most efficient when these mixtures are stoichiometrically balanced throughout the combustion chamber enclosure. This balance is best achieved by thoroughly mixing the fuel and combustion air prior to ignition.

One approach to improve the effectiveness of this mixing has been demonstrated in internal combustion engines by inducing a swirling flow, or vortexual fluid flow, in cold air intakes for internal combustion engines. This approach improves mixing of the fuel/air mixture, and therefore improves the efficiency of combustion. However, since combustion in an internal combustion engine takes place under compression, the chemical components in the exhaust gases have significant levels of Nitrous-Oxide compounds or $NO_x$, which must be mitigated by the employment of catalytic convertors or other devices to meet modern emissions standards.

Additionally, the mechanical energy derived by the pistons of an internal combustion engine originates from the irreversible heat transfer resulting from the combustion of the fuel/air mixture. This combustion generates pressure wave within the cylinder from the rapid expansion of hot gases, with the majority of the thermal energy being rejected as waste heat. The typical internal combustion engine has multiple methodologies to expel this waste heat, which represents lost energy. It should be noted that the majority of energy in modern hydrocarbon based fuels is in the potential thermal energy generated from combustion, and not in the explosive force generated by the combustion of the fuel/air mixture.

By contrast, a more efficient conversion of thermal energy to work can be found in external combustion engines, such as the Stirling Cycle engine, the Ericsson Cycle, the Rankine Cycle or other external combustion heat engine types. These engine designs rely upon the adiabatic expansion of a working fluid, in response to the addition of thermal energy to the cycle, to perform work. However, while external combustion engines have many desirable attributes, they also suffer from various infirmities. Hence, further improvements in these systems is necessary for them to emerge as viable commercial alternatives to internal combustion engines.

It has now been found that further improvements in the conversion of thermal energy to work in external combustion engine cycles may be realized with the systems and methodologies disclosed herein. In some embodiments, these improvements may be realized by the application of new materials and/or novel configurations of devices which enhance the mixing of fuel/air mixtures (before ignition) by inducing a vortexual fluidic flow in the fuel/air mixture. The use of thermal barrier coatings, such as those containing Zirconium-Dioxide or equivalents, may be utilized to further enhance the overall thermal efficiency of external combustion engine types by reducing parasitic heat losses.

Embodiments of the systems, methodologies and devices disclosed herein may be designed to improve the combustion of fuel/air mixtures in a combustion chamber enclosure of an external combustion engine. Such an engine may be, for example, a Stirling Cycle engine, an Ericsson Cycle engine, a Rankine Cycle engine, or an equivalent external combustion heat engine type. Improving the combustion of these fuel/air mixtures may help to reduce or minimize toxic and particulate emissions generated by the combustion process.

Embodiments of the systems, methodologies and devices disclosed herein may also be designed to improve or maximize the transfer of thermal energy generated from combustion to the mechanisms of the external combustion engine as, for example, by reducing or minimizing thermal energy losses with thermal barrier coatings. Since combustion in an external combustion engine occurs at atmospheric pressure, the levels of production of Nitrous-Oxides ($NO_x$) in exhaust gases may be significantly less than the levels typically encountered in the exhaust gases produced by internal combustion engines. This result may be magnified by the use of thermal barrier coatings, which effectively help to produce more work with less pollution.

In some embodiments of the systems, methodologies and devices disclosed herein, further enhancements in the overall thermal efficiency of the above mentioned external combustion engine types may be realized by creating fluidic flows in a swirling, vortex pattern. In particular, combustion air, after undergoing pre-heating, may be induced (for example, through the provision of spiral vanes in the fluidic flow path) to flow in a vortex pattern within the combustion chamber enclosure. Without wishing to be bound by theory, this flow pattern is believed to cause enhanced diffusion of the fuel/air mixtures throughout the combustion chamber, resulting in a more stoichiometrically balanced ratio of fuel to air. Here, it is also to be noted that there are typically no moving parts in the combustion chambers of Stirling Cycle engines, Ericsson Cycle engines, Rankine Cycle engines or other external combustion type heat engines.

A. Combustion Chamber

Figure 4:
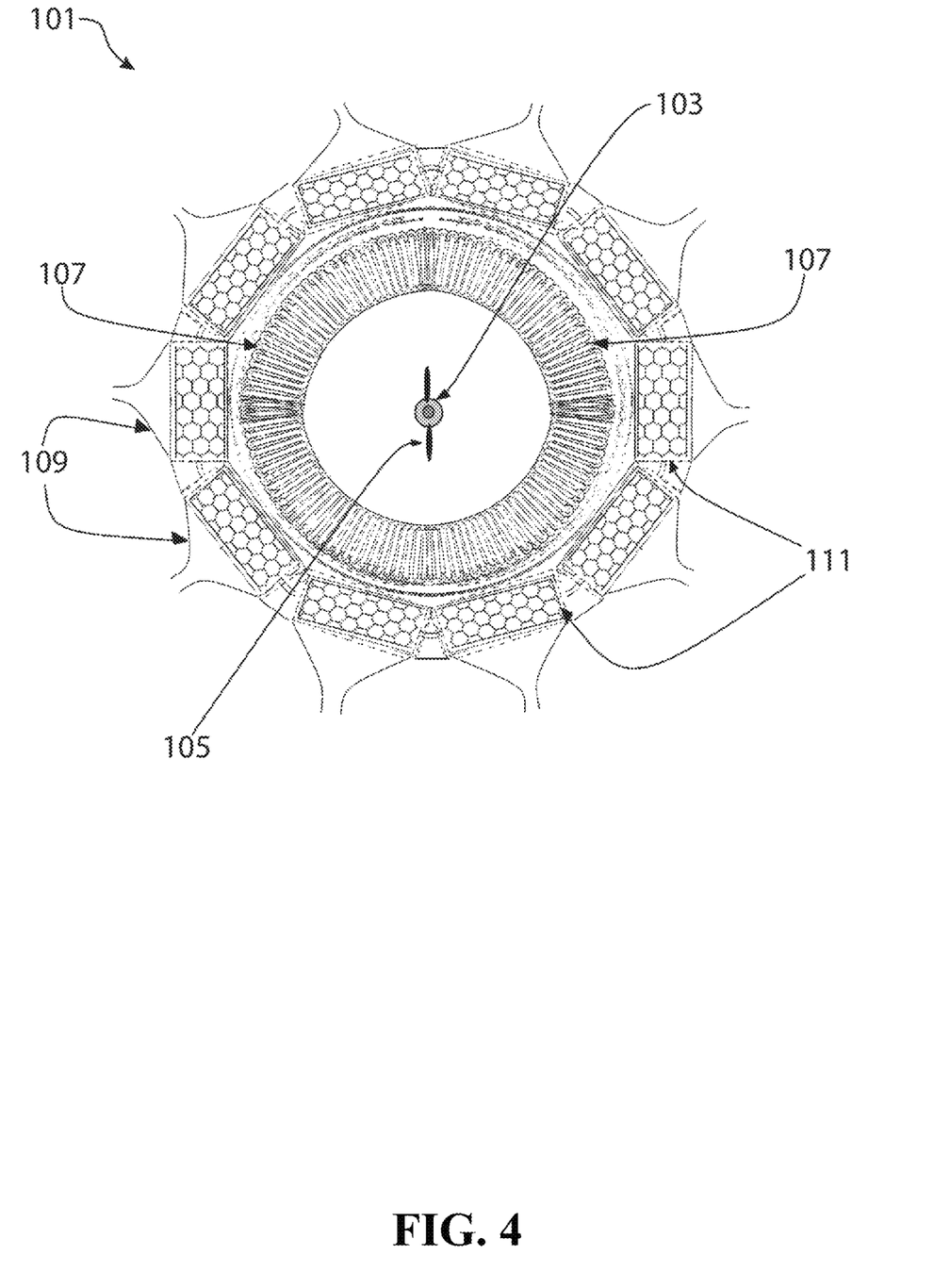
FIG. 4 is a diagrammatic representation of a plan view of a combustion chamber in accordance with the teachings herein.

The systems, devices and methodologies disclosed herein may be further appreciated with respect to the particular, non-limiting embodiment of the combustion chamber depicted in FIG. 4. With reference thereto, the combustion chamber 101 depicted therein comprises a centrally disposed fuel applicator 103 (also referred to as a vaporizer educator) and one or more ignition devices 105. The fuel applicator 103 vaporizes or atomizes a fuel provided by a fuel source, and the ignition device 105 ignites the vaporized fuel after it has mixed with air. The ignited fuel thus releases energy, which is absorbed by a working fluid (or motive gas) present in an array of heat tubes 107 that are radially disposed about the fuel applicator 103. The array of heat tubes 107 form part of a closed loop system for the fluidic flow of a working fluid between the combustion chamber 101 (which, in thermodynamic terms, acts as a heat source) and a heat sink. The temperature differential between the heat source and heat sink is used to drive one or more pistons, which thus provides motive power to a host device.

During normal operation, the combustion chamber 101 will form mixtures of a combustion gas (typically air) and fuel. Here it is to be noted that, while frequent reference will be made herein to forming fuel/air mixtures, or to forming mixtures of fuel with a combustion gas or with air, various other oxidizing agents may be utilized in the systems, devices and methodologies described herein. Hence, these systems, devices and methodologies should not be construed as being limited to the use of air as then oxidizing agent.

Referring again to FIG. 4, ambient air is supplied to the combustion chamber 101 through a combustion manifold 109 that is disposed about the combustion chamber 101. As explained in greater detail below, the combustion manifold 109 directs the air through an array of preheater blocks 111 and into the combustion chamber 101. The preheater blocks 111 serve to heat the air to a temperature more conducive for the formation and/or combustion of air/fuel mixtures.

Figure 1:
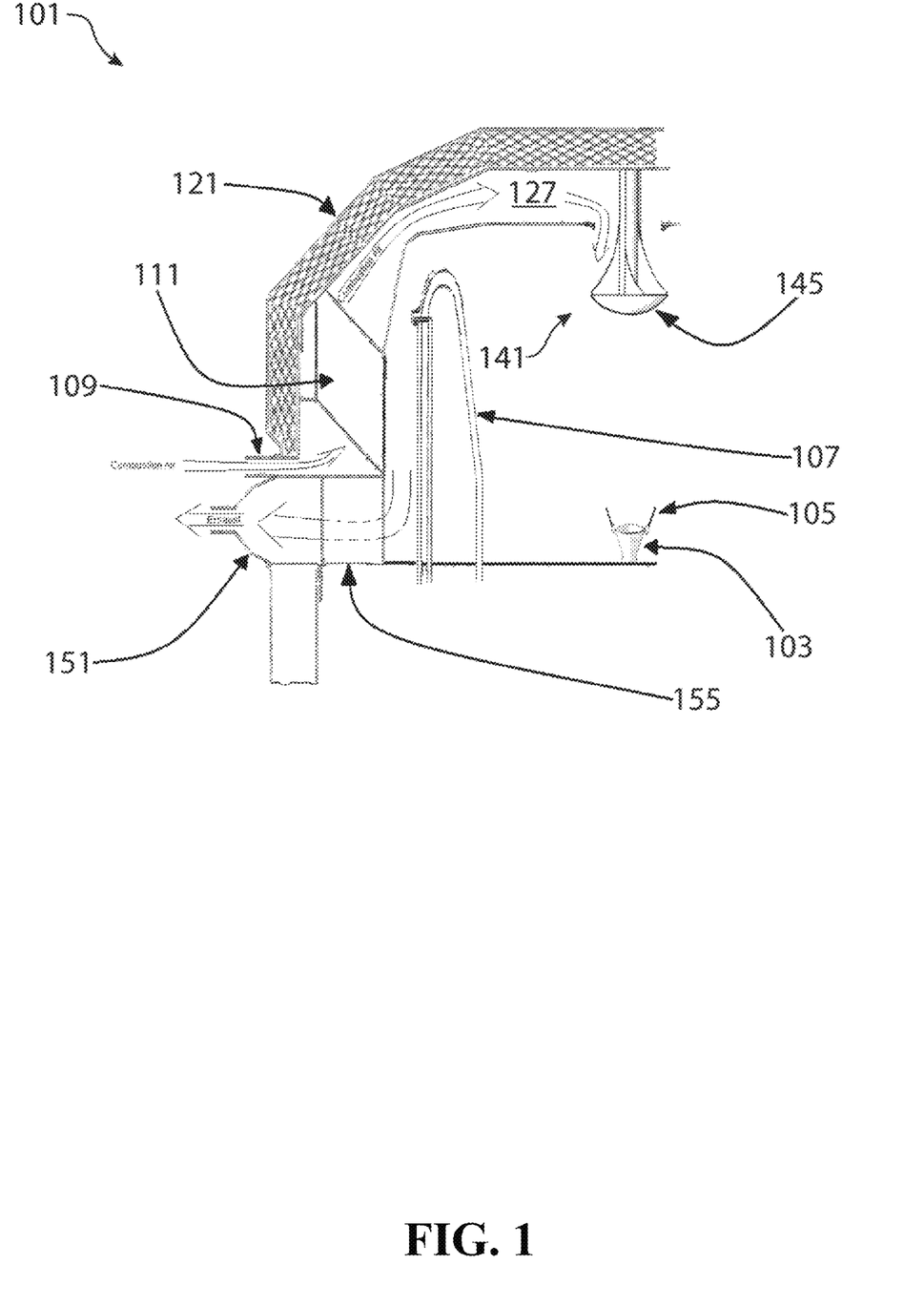
FIG. 1 is a diagrammatic cut away representation of a combustion chamber enclosure in accordance with the teachings hereon.
Figure 2:
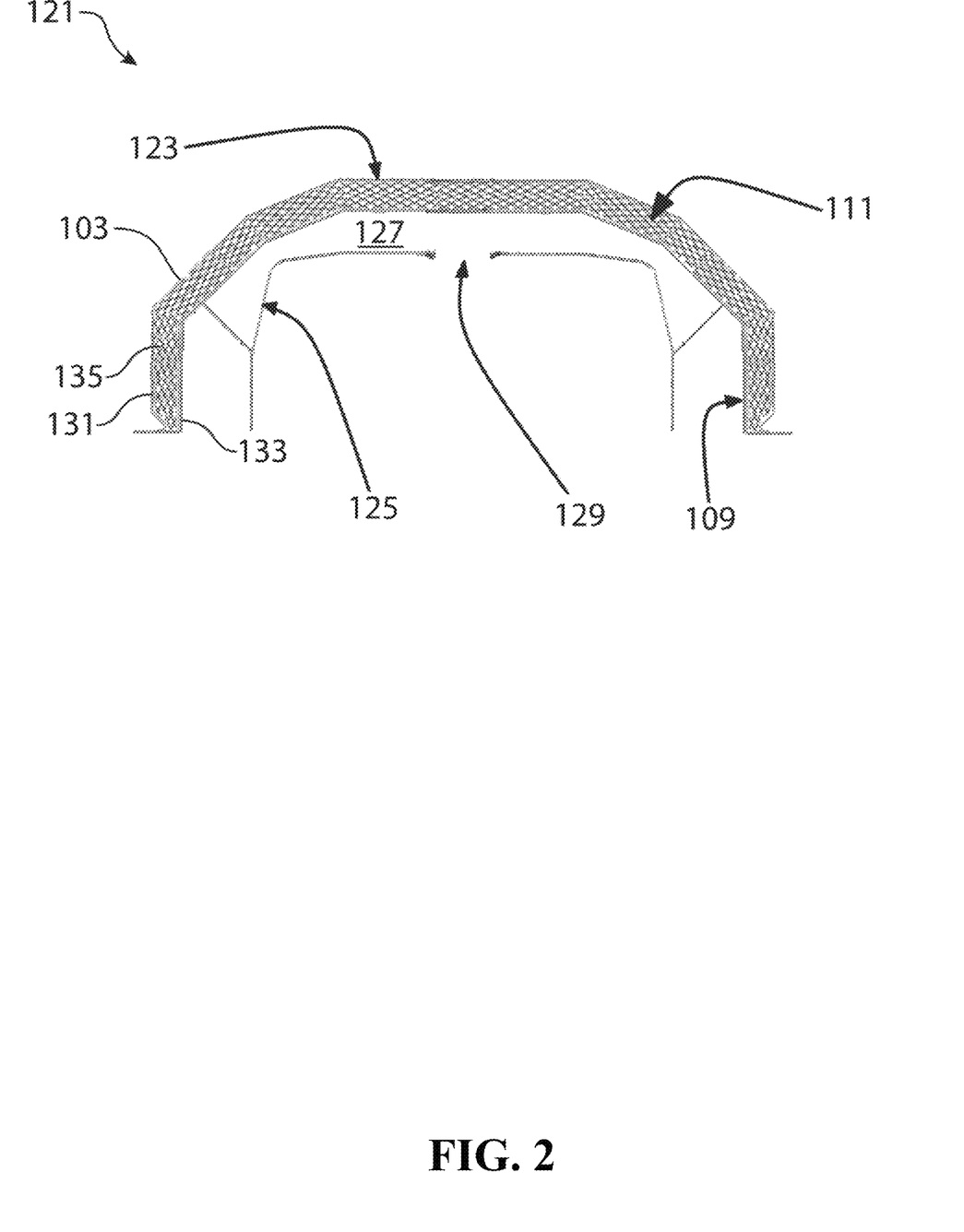
FIG. 2 is a cross-sectional view of a combustion chamber enclosure in accordance with the teachings hereon.

As seen in FIG. 1, the combustion chamber 101 is equipped with a cover 121 (the cover 121 has been removed from FIG. 4 for ease of illustration). In the particular embodiment depicted, the cover 121 is generally dome-shaped and extends to just outside of the array of preheater blocks 111. Referring to FIG. 2, where it is shown in greater detail, the cover 121 has a double hull construction, and thus comprises an outer layer 123 and an inner layer 125 which are spaced apart from each other to form a passageway 127 between them. The inner layer 125 is equipped with a central aperture 129 which is in fluidic communication with the passageway 127. The outer layer 123 comprises first 131 and second 133 sublayers with a thermally insulating material 135 disposed between them.

Figure 3:
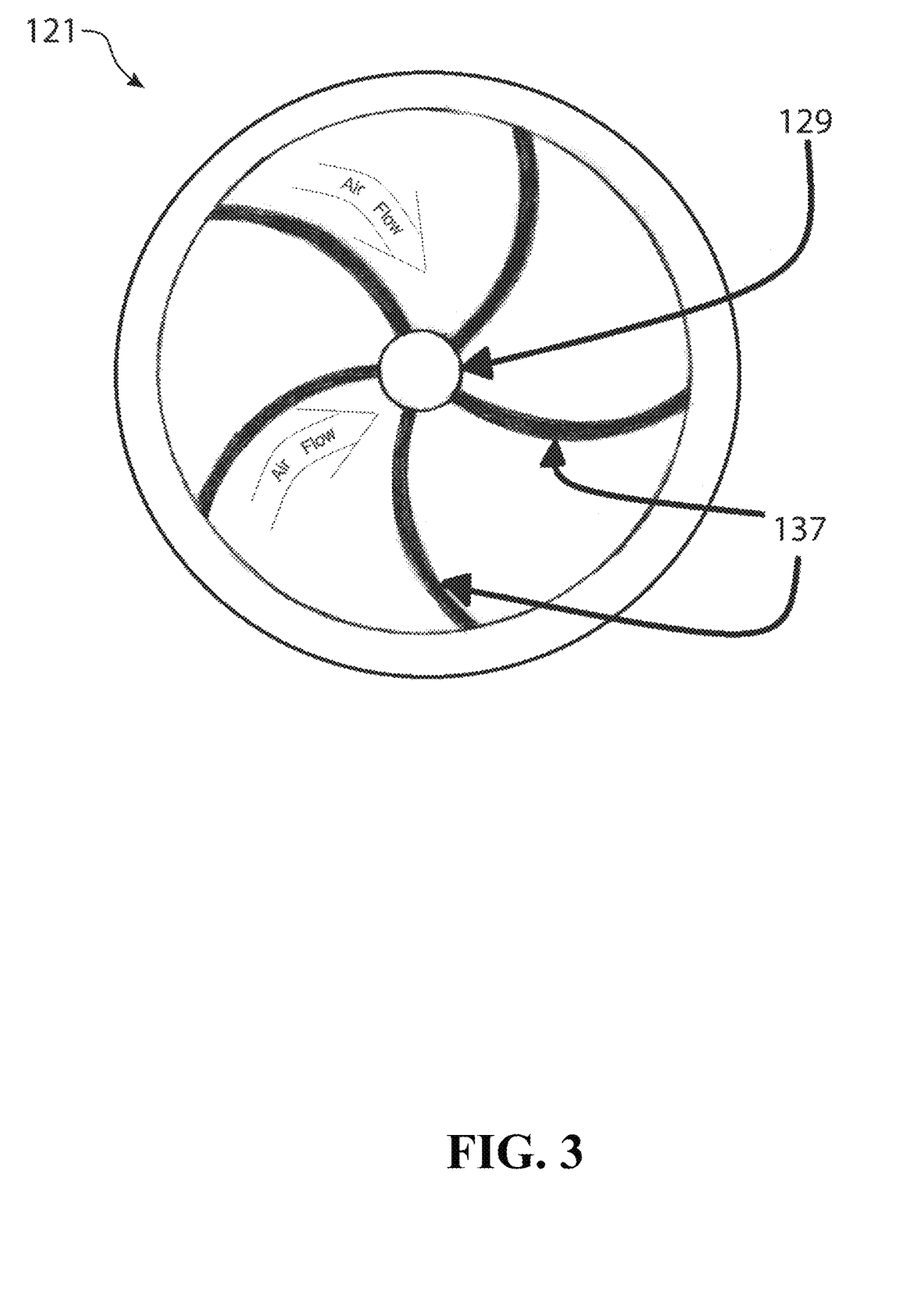
FIG. 3 is a plan view of a combustion chamber showing a plurality of vanes which are attached to the surfaces of the combustion dome cover.

As seen in FIG. 3, in the particular embodiment of the combustion chamber cover 121 depicted therein, an array of vanes 137 are provided in passageway 127. These vanes preferably extend between the inner layer 125 and the second sublayer 133 (see FIG. 2), and provide a 3-dimensional spiral structure through which the combustion gas flows as it enters the combustion chamber 101 through central aperture 129. As with the vortex and flame propagation front inducer 141 described below, this spiral structure is believed to impart a swirling fluidic flow to the combustion gas, thus creating a vortex in the combustion chamber. Without wishing to be bound by theory, such a vortex is believed to help ensure the creation of a homogeneous fuel/air mixture in the combustion chamber 101. Such a mixture is believed to undergo cleaner, more efficient combustion.

Figure 5:
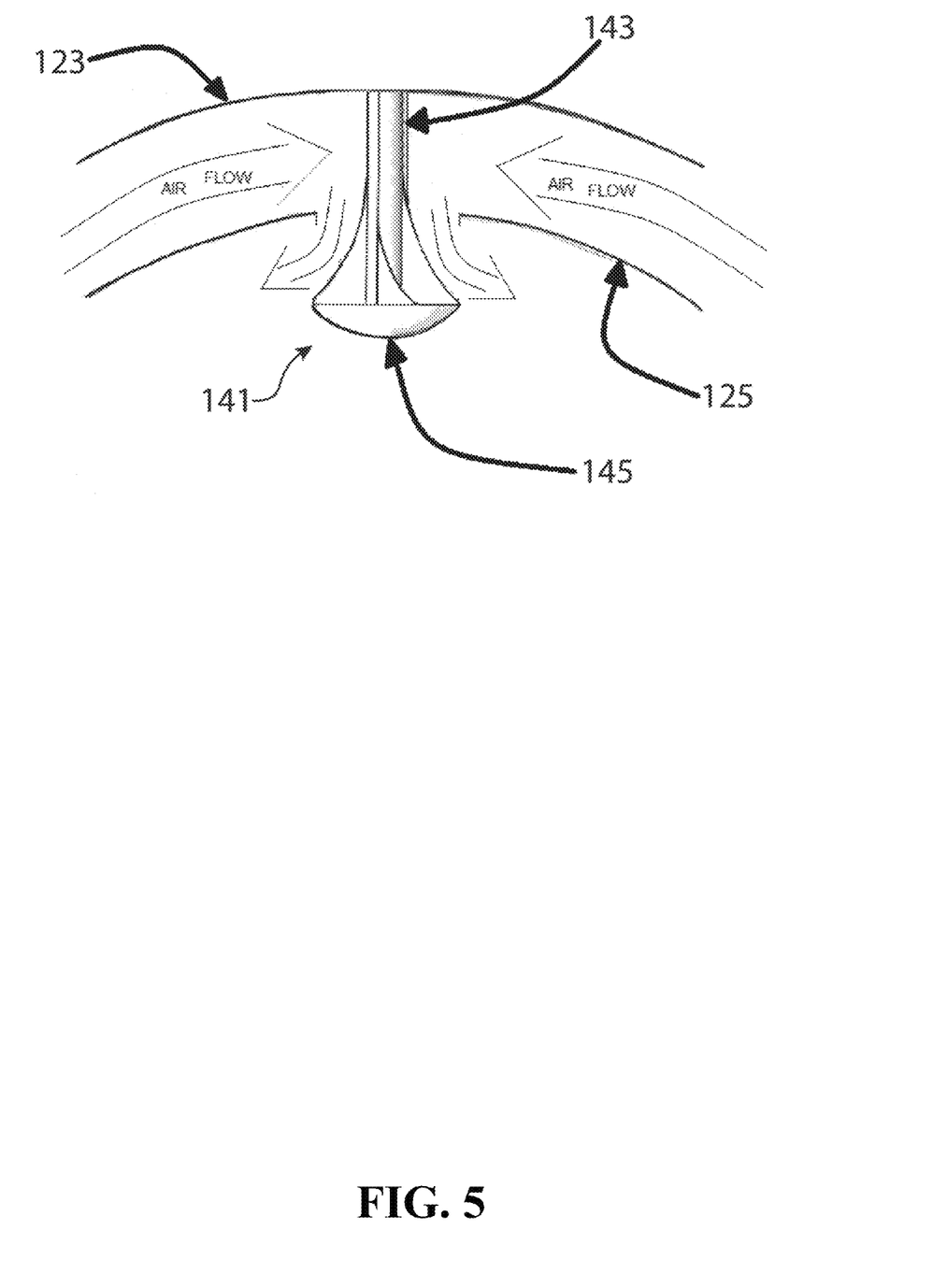
FIG. 5 is a side view, partially in section, of the vortex fluid flow and flame front propagation inducer of FIG. 1 mounted in the combustion chamber dome of an external combustion engine.
Figure 6:
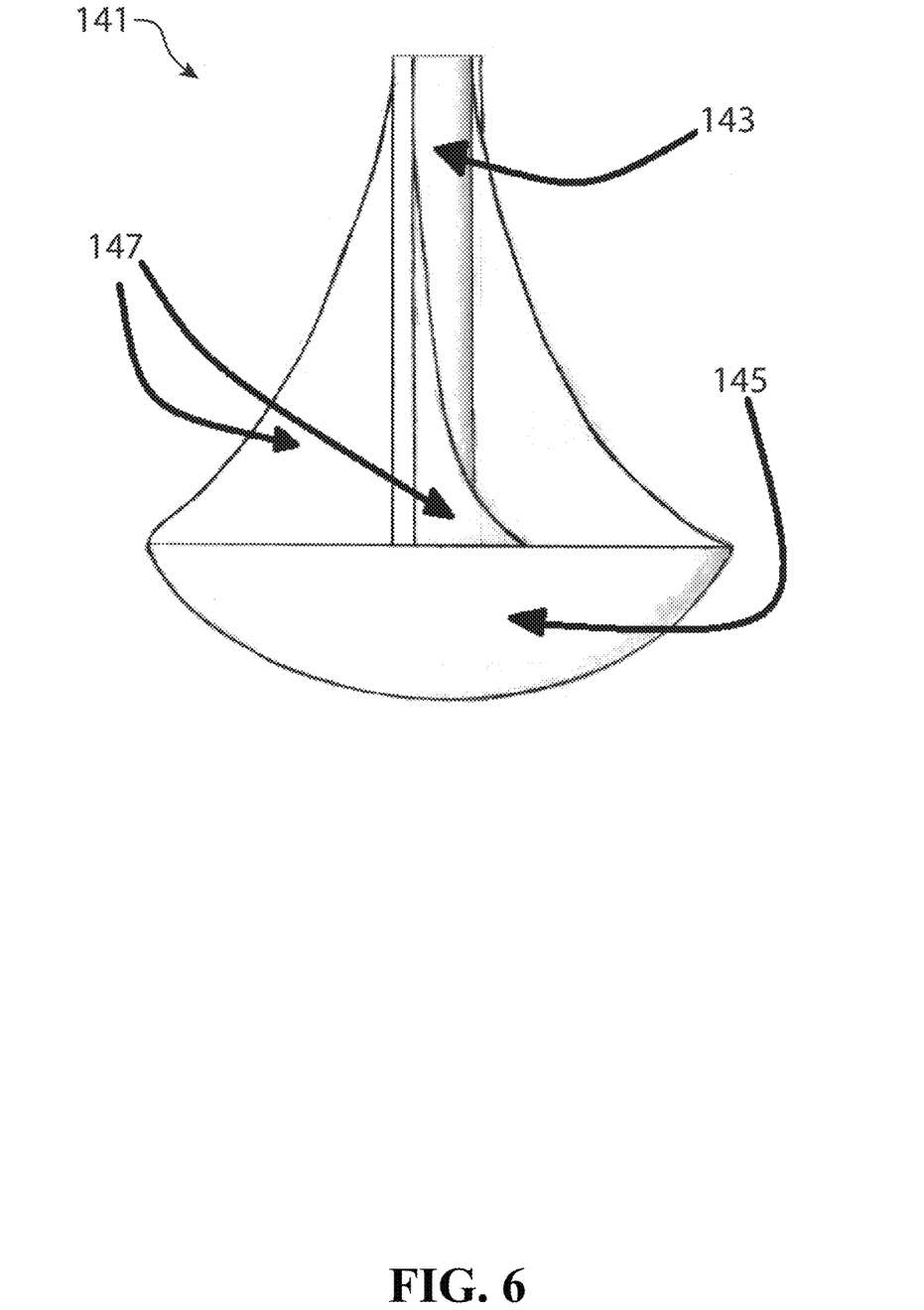
FIG. 6 is a side view of a vortexual fluid flow and flame front propagation inducer in accordance with the teachings herein.
Figure 7:
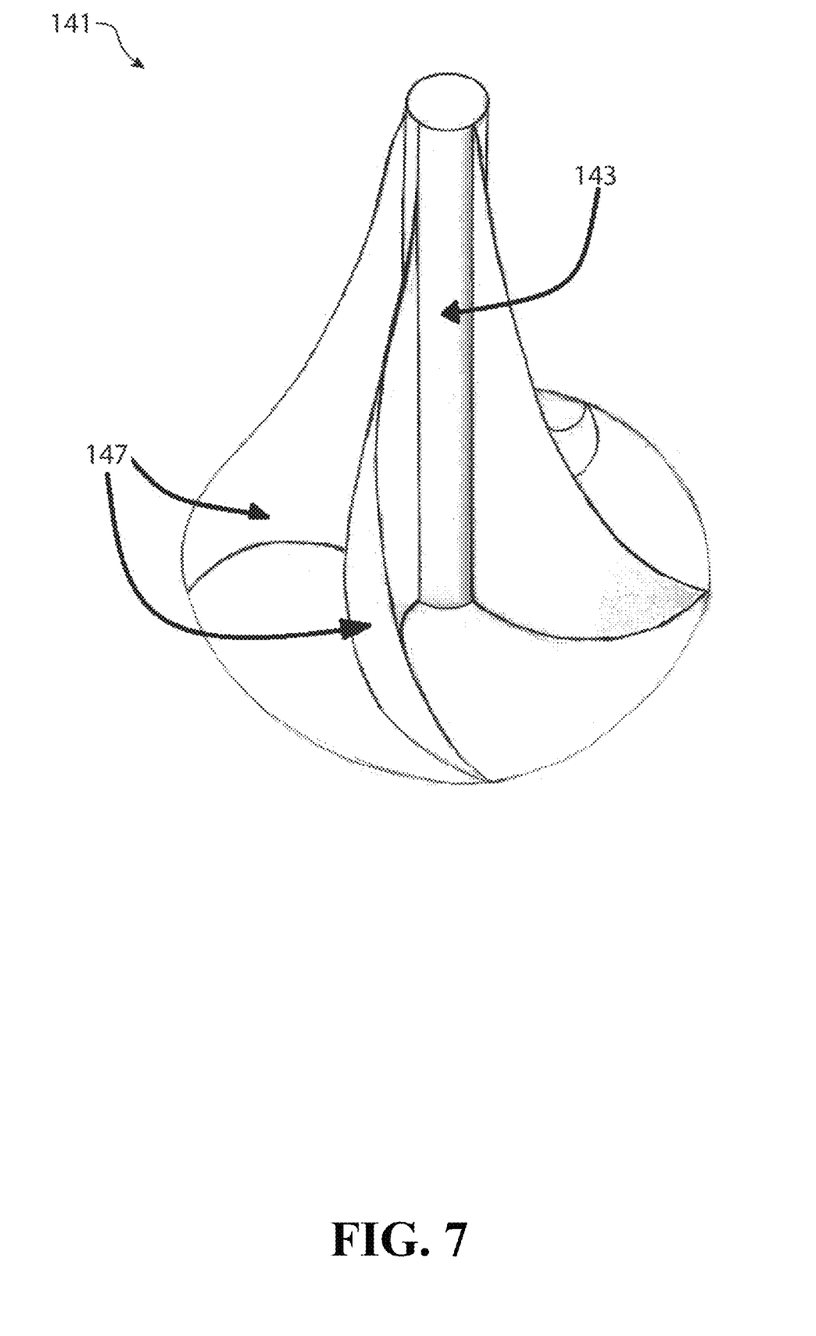
FIG. 7 is a perspective view of the vortexual fluid flow and flame front propagation inducer of FIG. 6.

A vortex and flame propagation front inducer 141, which is shown in greater detail in FIGS. 5-7, is mounted on the second sublayer 133 (see FIG. 2) and within the central aperture 129 (see FIG. 2) of the inner layer 125 of the combustion chamber cover 121. The vortex and flame propagation front inducer 141, which is shown in greater detail in FIGS. 6-7, is equipped with a shaft 143, a rounded or hemispherical terminus 145, and a series of spirally oriented vanes 147 which extend along the shaft 143 to the terminus 145. These vanes 147 help to impart a swirling, helical flow pattern to the air entering the combustion chamber 101 through the central apertures 129, thus creating a vortex in the combustion chamber 101. Without wishing to be bound by theory, the resulting vortex is believed to ensure a homogeneous fuel/air mixture that undergoes cleaner, more efficient combustion.

As previously noted, the exterior surface of the terminus 145 is rounded, preferably in the shape of a hemisphere or convex dome. Without wishing to be bound by theory, this surface is believed to help propagate the flame front away from the central area of the combustion chamber 101 and toward the outer margins thereof.

Figure 8:
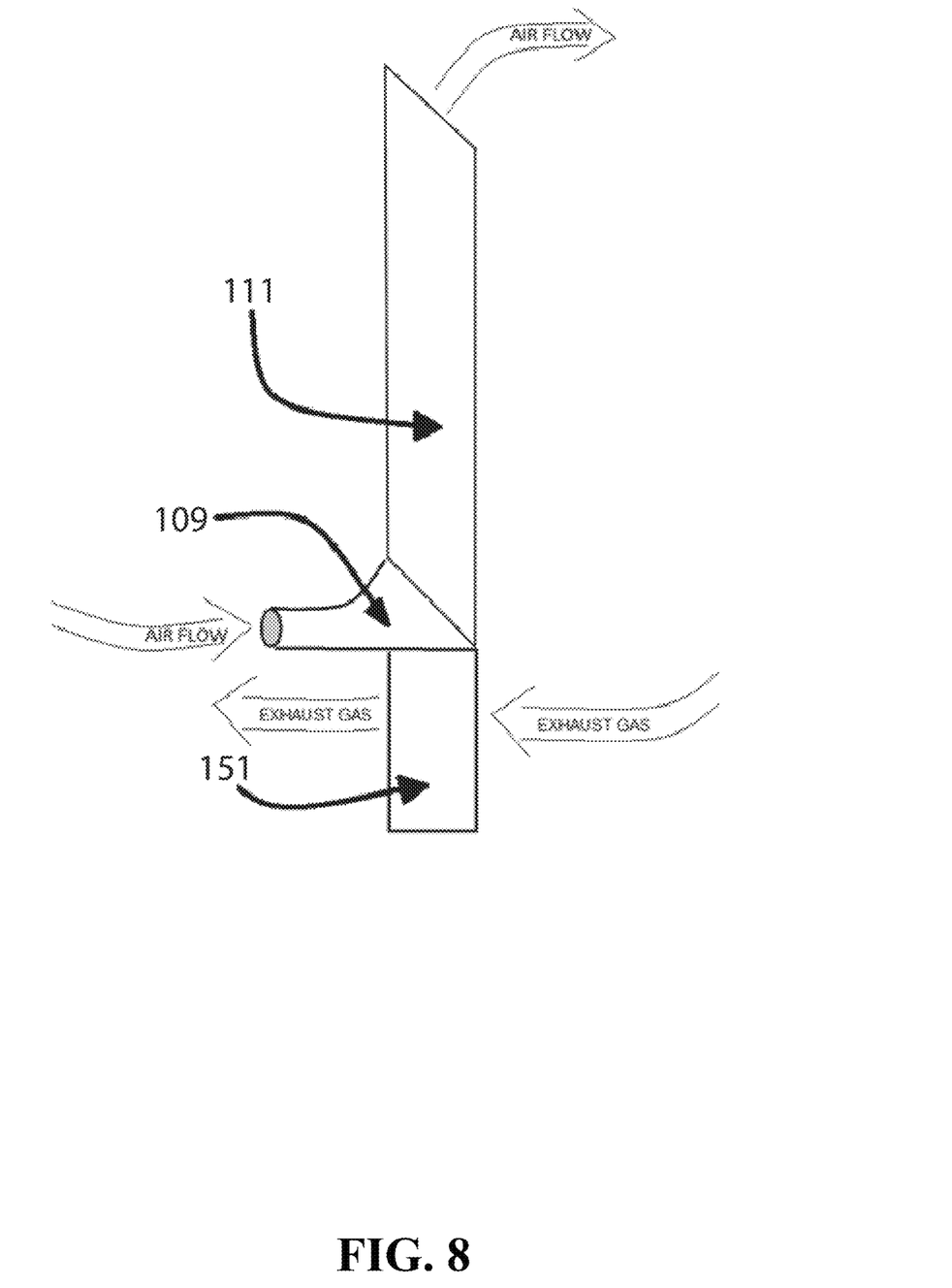
FIG. 8 is a side view of a vortexual fluid flow and flame front propagation inducer in accordance with the teachings herein.
Figure 9:
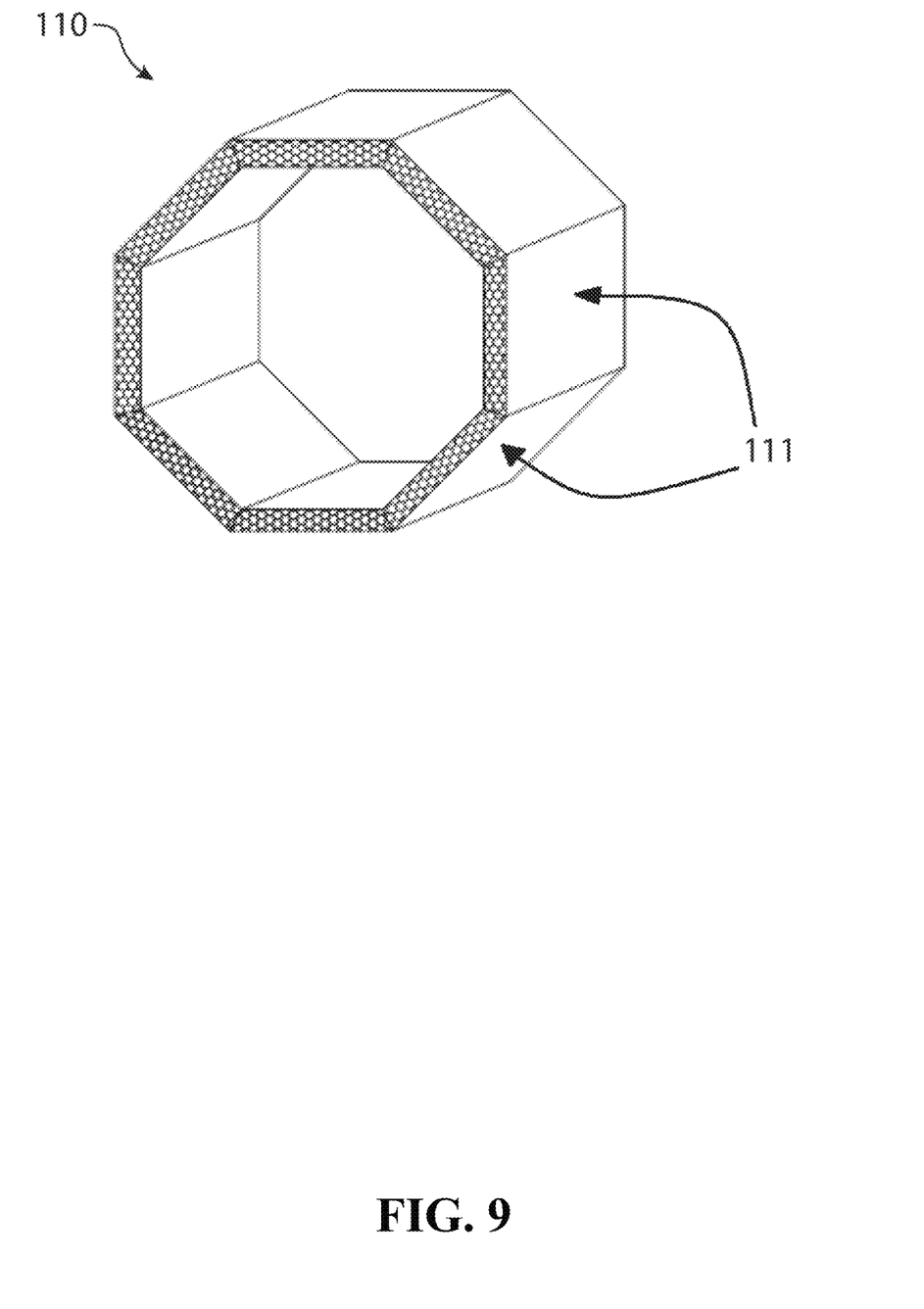
FIG. 9 is a perspective view of the vortexual fluid flow and flame front propagation inducer of FIG. 8.

The construction of the preheater blocks 111 may be further understood with respect to the particular, nonlimiting embodiments thereof which are depicted in FIGS. 1, 4 and 8-10. As seen in FIGS. 1 and 4, the preheater blocks 111 may be peripherally arranged in an array which is adjacent to the heater tubes 107 and inside of the cover 121. Although FIG. 4 depicts the preheater blocks 111 as being rectangular in shape and abutting adjacent preheater blocks along one vertex, the preheater blocks 111 may assume various geometries as may be necessary or desirable for a particular application, and may be disposed in various configurations. Thus, for example, FIG. 9 depicts an arrangement 110 of the preheater blocks 111 in which the preheater blocks 111 are trapezoidal in cross-section, and are arranged in an octagonal configuration. Other possible shapes for the cross-sections of the preheater blocks 111 and the configurations they are disposed in include, but are not limited to, parallelograms, polygons, circles, ellipses, and irregular shapes.

FIG. 8 shows the interface between the preheater blocks 111 and the combustion manifold 109 in greater detail. As seen therein, in the particular embodiment depicted, the combustion manifold 109 includes a portion that is physically or fluidically interconnected with each preheater block 111 to provide for fluidic flow from the combustion manifold 109 through each preheater block 111. Of course, it will be appreciated that various other interfaces may be utilized for this purpose, including various plug-and-play interfaces.

Figure 10:
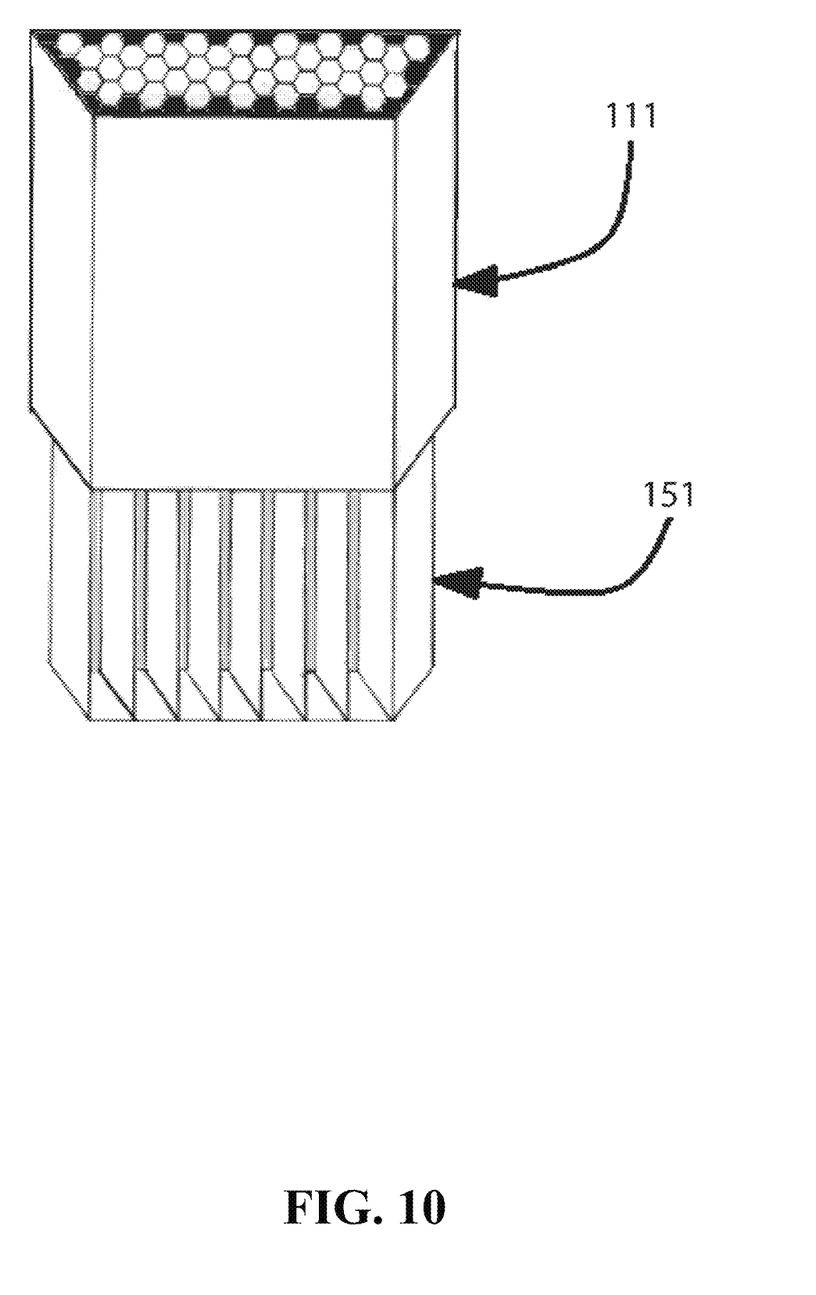
FIG. 10 is a side view, partially in section, of the vortex fluid flow and flame front propagation inducer of FIG. 8 mounted in the combustion chamber dome of an external combustion engine.

Referring again to FIG. 8, the combustion manifold 109 in this particular embodiment is seated above the exhaust manifold 151. More particularly, as shown in FIG. 10, each preheater block 111 is attached to the exhaust manifold 151 such that the heat fins 153 of the exhaust manifold 151 are in thermal contact with one or more of the preheater blocks 111. This may be through direct physical contact (for example, the preheater blocks and the combustion manifold may be molded as an integral unit), through the use of conductive intermediaries (such as, for example, conductive solders or pastes or through the use of heat transfer devices), or by other suitable means as are known to the art. The heat fins 153 serve to extract heat from exhaust gases and transfer it to the preheater blocks 111, thus using this otherwise wasted heat source to preheat the combustion gas.

FIG. 1 illustrates the fluidic flow of ambient air into the combustion chamber 101, and the flow of exhaust gases out of the combustion chamber 101. As seen therein, ambient air enters the combustion chamber 101 through the combustion manifold 109 and passes through the preheater blocks 111. The heated air then flows along a passageway 123 within the dome cover, where a swirling motion is imparted to it by the array of vanes 137. The heated air then exits the central aperture 129 of the inner layer 125 of the cover 121, where it is dispersed throughout the combustion chamber 101 in a swirling, vortex flow pattern by the vortex inducer 141. After the resulting fuel/air mixture is combusted, heat from the combustion is withdrawn by heater tubes 107 and transferred to the working fluid to allow the engine to perform work (this work will typically involve the operation of one or more pistons). The exhaust gases then exit the combustion chamber 101 via an exhaust vent 155 in the exhaust manifold 151, where heat is extracted from the exhaust gases. The extracted heat is then transferred to the preheater tubes 109 as described above.

B. Combustion Chamber Cover

As noted above, the combustion chamber cover disclosed herein, in its preferred embodiment, has a double hull construction comprising an outer layer, an inner layer, and an intervening space between the outer and inner surfaces. The outer layer may comprise first and second sublayers which are spaced part from each other by an intervening layer of a suitable, thermally insulating material. Preferably, a void space is maintained between the outer and inner layers of the dome cover to provide for a fluidic flow between the two layers. The void space between these two layers may allow for combustion air to flow freely from the outer perimeter of the dome cover to the center of the combustion chamber via a centrally located combustion air inlet cut into the inner layer of the dome cover.

The combustion air is preferably pre-heated along the outer perimeter of the combustion chamber cover. Within the combustion chamber cover, the flow of combustion air may pass parallel to, and be directed by, a set of vanes which are arranged in a spiral configuration. The set of vanes directs the combustion air from the pre-heaters toward the centrally located combustion air inlet in a swirling flow pattern that resembles a vortex. The surfaces of the combustion chamber cover may be coated with one or more suitable thermal barrier coatings or materials. Such barrier coatings may include, but are not limited to, Zirconium-Dioxide ($ZrO_2$), yttria-stabilized zirconia (YSZ), Mullite (a compound of alumina and silica having the formula $3Al_2O_3$-$2SiO_2$), alumina, ceria ($CeO_2$), rare earth zirconates, rare earth oxides, metal-glass composites, or various combinations of the foregoing materials (including, for example, ceria in combination with YSZ), and equivalent materials.

As previously noted, embodiments of the systems, methodologies and devices disclosed herein may be utilized to enhance the dynamic flow of combustion air in an external combustion engine to improve combustion through improved diffusion of the fuel/air mixtures, and to inhibit parasitic thermal energy losses where possible. These goals may be achieved, for example, by the application of new materials, techniques and improved geometries to the combustion chamber and combustion chamber cover. By utilizing more optimal geometries for these parts (which may enhance the mixing of the fuel vapors and combustion gas), and by minimizing parasitic thermal energy losses, thermal energy transfer rates to the working fluid may be increased significantly. This may result in overall improvements in the thermal efficiency of Stirling Cycle engines, the Ericsson Cycle engines, Rankine Cycle engines, and other external combustion heat engine types.

The combustion chamber cover may be configured as an integral unit, or may comprise a plurality of separate parts. The combustion chamber cover is preferably not an articulated device, but remains fixed in place to provide an enclosure around the upper portion of the combustion chamber.

The combustion chamber cover disclosed herein may comprise various materials. Preferably, the combustion chamber cover comprises one or more materials selected from the group consisting of ceramics, ceramic composites, metals, metal alloys, and metallic alloy composites. The materials used in its construction have thermal conductivities which are typically less than 5 $W \cdot m^{-1} \cdot K^{-1}$, preferably less than 1 $W \cdot m^{-1} \cdot K^{-1}$, more preferably less than 0.1 $W \cdot m^{-1} \cdot K^{-1}$, and most preferably less than 0.05 $W \cdot m^{-1} \cdot K^{-1}$. The surfaces of the dome cover may be coated with any of the thermal barrier coatings noted above such as, for example, Zirconium-Dioxide ($ZrO_2$).

C. Vortex Inducer

The vortex and flame propagation front inducers disclosed herein may be utilized to impart a swirling flow, or to create a vortex, in combustion gases entering the combustion chamber of external combustion engines. Such external combustion engines may include, but are not limited to, Stirling Cycle engines, Ericsson Cycle engines, Rankine Cycle engines, or other external combustion heat engines. These vortex and flame propagation front inducers are preferably designed to enhance the overall thermal efficiency of combustion by maximizing the thermal energy transfer rates and minimizing losses. Additionally, by inducing a swirling fluidic flow in the combustion chamber, diffusion of the fuel/air mixture may result in a more stoichiometrically ratio before ignition, thereby minimizing incomplete combustion and subsequent particulate pollution in the exhaust gases.

The vortex and flame propagation front inducers disclosed herein may be configured as one integrated unit, or may comprise a plurality of separate parts. These devices are preferably not articulated devices, but remain fixed in the central portion of the combustion chamber cover or enclosure. The device may have a central post which can be fixed to the portion of the upper inner surface of the combustion chamber geometrically opposite and centered across from a fuel inlet or fuel applicator and ignition device.

Atmospheric air may be circulated into the combustion chamber enclosure by means of a combustion air supply to provide for combustion air at a rate for a stoichiometrically balanced ratio of the fuel/air mixture to achieve clean combustion. The void space which forms a passageway in the combustion chamber cover may allow for the free flow of combustion air, which may flow through a central aperture defining a combustion air inlet. The flow of combustion air may pass through the combustion air inlet past the plurality of vanes of the vortex and flame propagation front inducer as the combustion air enters the combustion chamber enclosure.

Surfaces of the vortex and flame propagation front inducers may comprise, or be coated with, any of the thermal barrier materials disclosed herein, or other suitable materials as are known to the art for that purpose. This includes, for example, coatings or compositions based on Zirconium-Dioxide ($ZrO_2$). Such coatings or materials provide a thermal barrier which helps to reduce or minimize parasitic heat loss and the "cold start penalty."

The vanes affixed to the central post of the vortex and flame propagation front inducer may be arranged in a spiral configuration to minimize the impedance of combustion air flow into the combustion chamber enclosure. A flame front propagator is disposed at one end of the central post of the vortex and flame propagation front inducer. In a preferred embodiment, this flame front propagator has a convex hemispheroidal curved surface which may be configured in a parabolic, catenary or alysoid type curve to enhance the propagation of the flame front towards the heater heat or boiler tube array within the combustion chamber enclosure. The resulting swirling flame front may result in a more uniform distribution of thermal energy throughout and among the heater head or boiler tube arrays in the combustion chamber enclosure, thereby providing for a more uniform temperature along the surfaces of the heater head or boiler tube arrays.

The vortex and flame propagation front inducer preferably comprises materials with a low coefficient of thermal conductivity such as, for example, ceramics, ceramic composites, metallic alloys, or metallic composites having this characteristic. All of the surfaces may be coated with a thermal barrier coating such as, for example, Zirconium-Dioxide ($ZrO_2$) or any of the various thermal barrier coatings disclosed herein. The vortex and flame propagation front inducer may be partially or fully hollow to reduce or minimize the surface area to mass ratio, thereby reducing or minimizing parasitic thermal energy losses.

D. Preheater

As noted above, the internal combustion engine design of the now obsolete Hot Vapor Engine, which was an Otto Cycle internal combustion engine, represented an early attempt to heat combustion air prior to its use in fuel/air mixtures. It is significant to note that the motive power derived by the pistons of an Otto Cycle internal combustion engine originates from the rapid expansion of hot gases during combustion. This expansion creates an explosive pressure wave, which initiates the motion of the piston at the moment of ignition of the fuel/air mixture within the cylinder. The typical Otto Cycle internal combustion engine implemented multiple methods to reject waste heat generated in this process, which thus represents lost energy in that system.

By contrast, the more efficient external combustion heat engine designs (such as, for example, the Stirling Cycle engine design, the Ericsson Cycle engine design, and the Rankine Cycle engine design) convert more of the available thermal energy in the fuel to work. It is significant to note that the majority of energy generated by modern hydrocarbon-based fuels is in the thermal energy generated from combustion, not in the pressure wave of the expanding gases of the ignited fuel/air mixture.

Some aspects of the systems, devices and methodologies disclosed herein are designed to improve the efficiency of combustion in external combustion heat engine designs. Improvements in combustion efficiency help to minimize toxic and particulate emissions from the combustion of fuel/air mixtures in the combustion chamber enclosure of external combustion engines.

Additionally, some aspects of the systems, devices and methodologies disclosed herein are designed to improve or maximize the transfer of thermal energy generated from combustion to the mechanisms of external combustion engines. Since combustion in such engines occurs at atmospheric pressure, the production of Oxides of Nitrogen ($NO_x$) in exhaust gases may be reduced significantly. Achieving a more uniform temperature field within the combustion chamber enclosure may increase the rate of diffusion of the fuel/air mixture, thereby resulting in a more stoichiometrically balanced ratio of the fuel and combustion air and minimizing particulate pollution in the exhaust gases. Moreover, improvements in the rate at which thermal energy is transferred help to reduce or minimize the time delay of the "cold start penalty", thus enhancing the overall thermal efficiency of these engine types.

In a preferred embodiment of the systems, methodologies and devices disclosed herein, pre-heaters are utilized for preheating an oxidizing agent (typically air or oxygen, although other oxidizing agents may be utilized as well) prior to its use in forming a fuel/oxidizing agent mixture. In a preferred embodiment, these preheaters may take the form of one or more honeycombed blocks having a plurality of polygon-shaped apertures, holes or tubes therein. In an especially preferred embodiment, these honeycombed blocks consist of regular or irregular tube-like structures which simultaneously provide a large (or maximum) surface area and a compact structure through which combustion air may flow freely.

In some embodiments, the pre-heaters may be disposed about the outer margin or periphery of the combustion chamber enclosure such that the thermal energy of combustion may be transferred to the matrix material of the pre-heater block. This thermal transfer may take place through the surfaces of the pre-heater blocks, and may occur by one or more processes selected from the group consisting of radiation, convection and conduction. The pre-heaters preferably comprise metal, metal alloys, metallic composites, ceramics, or ceramic composites. More preferably, the pre-heaters comprise materials having a high coefficient of thermal conductivity.

Preferred embodiments of the preheaters have a shapes and compositions which are highly conducive to thermal energy transfer, and also have large surface area-to-mass ratios. Such configurations may provide faster thermal energy transfer rates to the combustion air, while also minimizing boundary layer effects as the combustion air flows through the pre-heater.

Moreover, the foregoing enhancements to the surface area to mass ratio and the geometries of the pre-heaters may result in more rapid thermal energy transfer rates to the matrix material of the pre-heaters. This may result in reductions in the time delay associated with cold start penalties. This may also provide shorter time intervals to achieve a more uniform temperature field within the combustion chamber enclosure, which may provide more efficient combustion. In particular, the enhanced temperature provided by these enhancements may induce a more rapid diffusion of the fuel/air mixture, thus providing for a more stoichiometrically balanced ratio of fuel/air mixture. The more complete mixing which may be realized with these enhancements may minimize incomplete combustion of the fuel, thus resulting in overall improvements in the thermal efficiency of combustion and a simultaneous reduction of particulate pollutants in the exhaust gases of external combustion engines.

Preferred embodiments of the systems, devices and methodologies disclosed herein feature a combustion air pre-heater for application within the combustion chamber enclosure of an external combustion heat engine. Such engines include, for example, Stirling Cycle engines, Ericsson Cycle engines, Rankine Cycle engines and their equivalents. The some of the improvements to these devices as described herein are intended to enhance the overall thermal efficiency of combustion within the combustion chamber enclosure, and thereby improve the overall thermal efficiency of external combustion heat engine designs. Since combustion in these engine types occurs at atmospheric pressure, pre-heating combustion air before mixing with the fuel may provide for a more stoichiometrically balanced ratio of the oxidizer and fuel, and as a result of enhanced diffusion of the fuel/air mixture within the combustion chamber enclosure, the resulting particulate pollution may be significantly reduced regardless of the type of fuel used.

The pre-heaters may be an integrated unit, or may comprise an array of separate parts. The pre-heaters are preferably not articulated devices, but remain in a fixed location within the combustion chamber enclosure. The preheaters are preferably disposed in an array made up of a plurality of similar or identical preheaters, which may be located along the outer margins of the combustion chamber enclosure and may be connected to a conduit or manifold through which combustion air is supplied. The pre-heaters may be configured in such a manner as to allow for exhaust gases to vent freely from the combustion chamber enclosure to the exhaust gas conduit or manifold. Exhaust gases may flow freely past the plurality of surfaces of the preheaters and the conduit or manifold of the combustion air for additional thermal energy transfer to the combustion air through the outer surfaces of the pre-heaters. In some embodiments, heat may also be transferred to the preheaters from the exhaust gases through one or more heat transfer devices or materials.

The pre-heaters preferably comprise materials with high coefficients of thermal conductivity. Such materials may include, for example, various ceramics, ceramic composites, metals, metal alloys or metallic composites containing substances such as cubic Boron-Nitride (c-BN), Zirconium-Diboride ($ZrB_2$) and/or equivalent materials. The concentration of highly thermally conductive substances within the matrix of the material from which the preheaters are fabricated may be sufficiently high to provide for coefficients of thermal conductivity which are greater than the thermal conductivities of atmospheric air, thereby promoting a faster transfer of thermal energy to the flow of combustion air.

At each end of the pre-heaters there may be a plurality of apertures or holes comprising a plurality of tubes or conduits, through which the combustion air may pass freely. These tubes or conduits may have cross-sectional shapes which are polygonal and which have obtuse angles between each face of the polygonal surface, and may be configured to increase or maximize the surface area to mass ratio of the preheaters. The polygonal tubes or conduits may be arranged in closely packed groups, with little or no gap between each tube. The plurality of apertures or holes forming the tubes may be of a geometric design so as to induce the formation of vortex fluid flows as combustion air flows through the pre-heaters toward the center of the combustion chamber enclosure. This may help to limit fluid dynamic drag from the boundary layer effect. By reducing or minimizing the boundary layer effect, the combustion gas may absorb thermal energy from the surfaces of the pre-heater at an improved rate as the combustion air flows through the pre-heater.

Preferably, the preheaters are equipped with polygonal-shaped tubes having a longitudinal axis, and with outer surfaces that are parallel to the longitudinal axes of these tubes. These outer surfaces may be impervious to the free flow of combustion air or exhausts gases. The outer surfaces of the preheater may be adjacent to, or integral with, exhaust gas vents, which may allow for the free flow of exhaust gases from the combustion chamber enclosure to the exhaust manifold or conduits. Exhaust gases may flow freely past the outer surfaces of the pre-heaters and the outer surfaces of the combustion air conduits or manifolds. This arrangement allows for the transfer of thermal energy to the combustion air by conduction, radiation or convection through the outer surfaces of the pre-heaters and the combustion air manifold.

The polygonal shaped tubes or conduits in preferred embodiments of the pre-heaters may have an inlet side and an outlet side which may be suitably shaped to create a vortex in the fluid flow of the combustion air. The overall three-dimensional shape of the pre-heater blocks may be trapezoidal or another regular polygonal shape. Such shapes may provide a system of compact interlocking segments and surfaces of the plurality of preheaters within the combustion chamber enclosure, while maximizing surface area to mass ratios.

The preheaters may be configured in one integrated unit or be composed of separate parts. Such parts may include, for example, combustion air manifolds, combustion air inlets, combustion air outlets and exhaust vents. Each surface of the plurality of parts of the pre-heaters may be designed to enhance or maximize dynamic fluid flow and thermal energy transfer rates from the surfaces of the pre-heaters to the combustion air within the combustion chamber enclosure, while simultaneously passively absorbing the thermal energy generated from combustion at an enhanced rate to minimize the time delay of the "cold start penalty."

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:
1. An external combustion engine, comprising:
a source of combustion gas;

a combustion gas manifold which is in fluidic communication with said source of combustion gas;

a combustion chamber where a mixture of the combustion gas and fuel undergoes combustion to generate heat;

a cover which encloses said combustion chamber, wherein said cover has a first layer and a second layer which are spaced apart from each to form a fluidic flow path between them, and wherein said second layer contains an aperture which is in fluidic communication with said combustion gas manifold via said fluidic flow path; and a plurality of heating blocks through which said combustion gas passes as said combustion gas flows from said combustion gas manifold to said aperture;

wherein each of said heating blocks is in thermal contact with a plurality of heat fins through which said exhaust gases pass;

wherein said combustion manifold has a plurality of inlets;

wherein each of said plurality of inlets is in fluidic communication with at least one of said plurality of heating blocks;

wherein each of said heating blocks comprises a plurality of heating tubes which heat the oxidizing agent as it flows through the heating block, and wherein each of said plurality of heating tubes is hexagonal in a cross-section taken perpendicular to said longitudinal axis; and wherein said cover is equipped with a set of spiral vanes disposed in the fluidic flow path.

2. The external combustion engine of claim 1, wherein said second layer contains a first surface which faces the combustion chamber, and a second surface which faces said second layer, and wherein said set of spiral vanes are disposed on said second surface.

3. The external combustion engine of claim 1, wherein said cover is equipped with a vortex inducer disposed in, or proximal to, said aperture.

4. The external combustion engine of claim 3, wherein said vortex inducer includes a shaft with a set of spiral vanes disposed thereon.

5. The external combustion engine of claim 4, wherein said shaft has a longitudinal axis, and wherein said set of spiral vanes extend along said longitudinal axis.

6. The external combustion engine of claim 1, wherein said cover has a periphery, and wherein said first and second layers form a fluidic conduit which extends from said periphery to said aperture.

7. The external combustion engine of claim 6, wherein each vane in said set of spiral vanes extends from said periphery to said centrally disposed aperture.

8. The external combustion engine of claim 1, further comprising:

at least one piston;

a fuel applicator which is disposed in said combustion chamber and which vaporizes said fuel;

an array of heater tubes disposed within said combustion chamber which absorb heat given off by the combustion of the mixture of the combustion gas and the vaporized fuel;

a heat sink; and a working fluid which drives said at least one piston by traveling in a closed loop which includes said heater tubes and said heat sink.

9. The external combustion engine of claim 1, wherein said cover comprises a material having a coefficient of thermal conductivity which is less than 5 W·m−1·K−1.

10. The external combustion engine of claim 1, wherein said cover comprises a material having a coefficient of thermal conductivity which is less than 1 W·m−1·K−1.

11. The external combustion engine of claim 1, wherein the surfaces of said spiral vanes are coated with a thermal barrier coating comprising zirconium dioxide.

12. The external combustion engine of claim 1, wherein said first layer comprises first and second sublayers having a thermally insulating material disposed between them.

13. The external combustion engine of claim 1, wherein each of said plurality of heating tubes has a longitudinal axis and an inlet and outlet which are in fluidic communication with each other along said longitudinal axis, and wherein said plurality of heat fins are disposed at said at least one outlet and are attached to one of said heating blocks.

14. The external combustion engine of claim 1, further comprising a plurality of sets of heat fins, and wherein each of said plurality of sets of heat fins is attached to one of said heating blocks.

15. The external combustion engine of claim 1, wherein each of said plurality of heating tubes has a longitudinal axis and an inlet and outlet which are in fluidic communication with each other along said longitudinal axis, and wherein each of said plurality of heating tubes is polygonal in a cross-section taken perpendicular to said longitudinal axis.

16. The external combustion engine of claim 1, wherein said plurality of heating blocks are disposed about the periphery of said combustion chamber.

* * * * *